2 Sheets--Sheet 1.

C. F. A. SIERCKS.
Upholstering Apparatus.

No. 162,501. Patented April 27, 1875.

WITNESSES.

INVENTOR.
Charles F. A. Siercks
By Gridley & Warner
Attys.

2 Sheets--Sheet 2.

C. F. A. SIERCKS.
Upholstering Apparatus.

No. 162,501.   Patented April 27, 1875.

WITNESSES
F. H. Lawlor
A. Wiswall

INVENTOR
Charles F. A. Siercks.
By Gridley & Warner
Attys

THE GRAPHIC CO.PHOTO-LITH.39 & 41 PARK PLACE, N.Y.

UNITED STATES PATENT OFFICE.

CHARLES F. A. SIERCKS, OF CHICAGO, ILLINOIS.

IMPROVEMENT IN UPHOLSTERING APPARATUS.

Specification forming part of Letters Patent No. 162,501, dated April 27, 1875; application filed December 4, 1874.

*To all whom it may concern:*

Be it known that I, CHARLES F. A. SIERCKS, of Chicago, in the county of Cook and State of Illinois, have invented a new, useful, and Improved Apparatus for Upholstering, of which the following is a full, clear, and exact description, which will enable others skilled in the art to which my invention appertains to make and use the same, reference being had to the accompanying drawing forming a part hereof, and in which—

Figure 1:
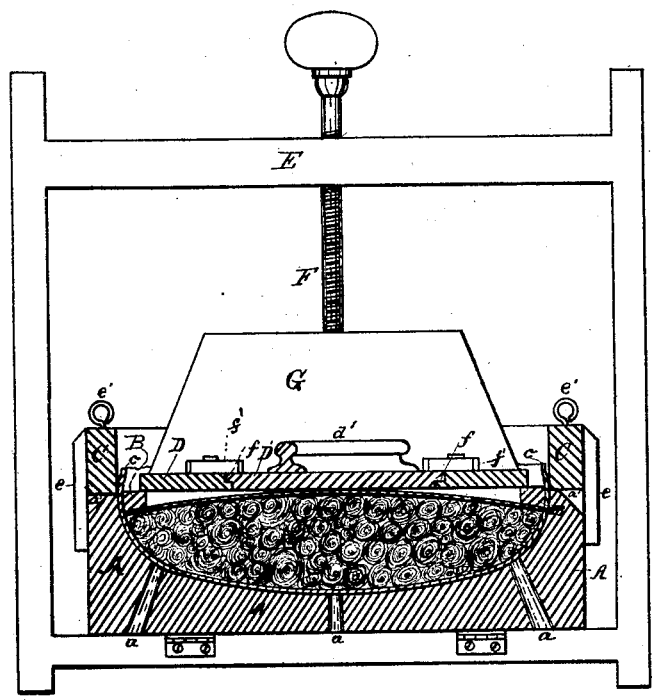
Figure 2:
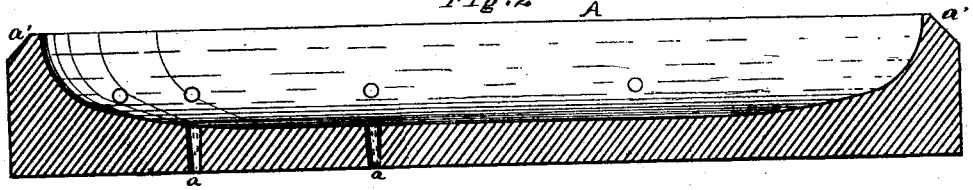
Figure 3:
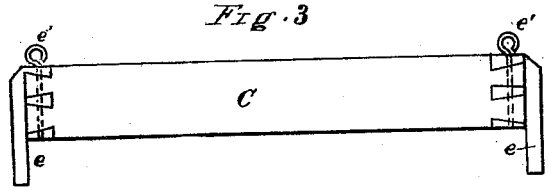
Figure 4:
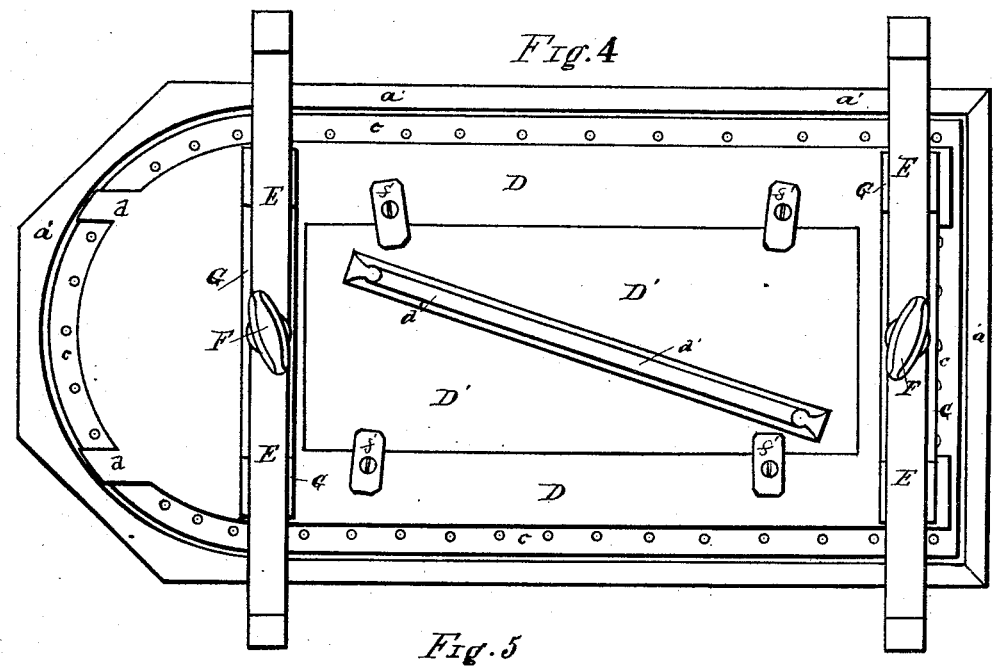
Figure 5:
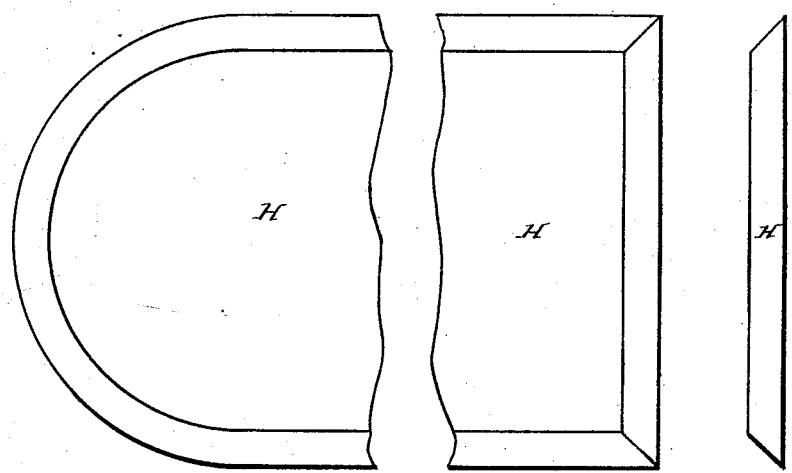

Figure 1, Sheet 1, is a vertical cross-section through my apparatus when containing a cushion partly upholstered; Fig. 2, Sheet 1, a vertical central longitudinal section through the mold; Fig. 3, Sheet 1, an end view of one of the removable frames; Fig. 4, Sheet 2, a top view of the whole apparatus arranged together and inclosing a cushion; and Fig. 5, Sheet 2, a modification in the construction of the presser.

Like letters of reference indicate like parts.

In the drawing, A represents the mold. This part is cut out on its upper face, so that this face will approximate the upper part of the cushion in form. I also deem it preferable, but not essential, to perforate the mold, as shown at $a$, and to bevel its upper edge, as shown at $a'$, for the purposes hereinafter mentioned. B is a frame, constructed to lie in the upper part of the mold. C is a frame, corresponding in form to the upper edge of the mold, and constructed to rest thereon. This frame is provided with lugs $e\ e$, arranged to lap the sides of the mold. One end of this frame is dovetailed to the ends of the sides, as shown in Fig. 3, and $e'\ e'$ are pins, passing the dovetailed parts, as shown. D is a presser, constructed to lie within the frame C, leaving a space between the said frame and the edge of the presser, as shown in Fig. 4. The presser is prevented from being moved horizontally in the frame C by means of the projections $d\ d$, extending from the presser to the frame. I deem it preferable to make the central part of this presser removable from the remaining part. This removable part is shown at D′, and is provided with a cleat, $d'$, to facilitate its removal and replacement. The part D′ rests upon small sills $f\ f$, projecting from the part D, and is held thereon by means of the buttons $f'\ f'$. E E are frames, hinged to the bottom of the mold in such a manner as to be capable of being arranged either in a vertical or in a horizontal position. F F are screw-pins, passing through the upper cross-bars of the frames E E. G G are blocks arranged below the pins F F, and resting on the presser D. H is a substitute for the frame D. The part H nearly fills the frame C, and its edge is beveled, in the manner shown in Fig. 5.

In using this apparatus, the linen or other material which is to receive the hair or filling, and which lies in the upper part of the cushion, is arranged smoothly in the bottom of the mold, the edge of the cloth projecting somewhat above the edge of the mold, as shown at $c$, Fig. 1. I then fill the mold with the filling, arranging the latter as evenly as possible over the cloth, due regard being had to the form of the cushion, and to the amount of filling it is to contain. I then attach to the under side of the frame B the linen or other cloth which constitutes the bottom of the cushion. If the filling projects above the edge of the mold, as it will in most cases, I build up the mold by arranging thereon the frame C, in which case the cloth in the bottom of the mold should be arranged below the edge of the said frame, instead of as shown at $c$. When sufficient filling has been thus arranged in the mold, I arrange the frame B, with the cloth attached thereto, within the frame C. On the frame B I then arrange the presser D, and on the latter I arrange the blocks G G. I now swing the frames E E to a vertical position, and turn the screws F F in such a direction that the blocks G G will be forced downward, thus pushing down the presser D and the frame B until the filling is sufficiently packed. If I have any doubt about the filling being evenly arranged I remove the part D′, and, if necessary, crowd the filling to its proper place. I then remove the pins $e'\ e'$, and draw away the frame C. The edge of the cloth in the mold may now be folded over the frame B, and tacked or otherwise attached thereto. The screws F F may be now loosened, the frames E E tilted to a horizontal position, and the blocks G G, presser D, and cushion may all be removed.

It will be perceived from the foregoing description that the frame B is thus inclosed within the cushion. When this is not desired, I employ the part H in lieu of the presser D, first arranging over the filling the cloth which constitutes the bottom of the cushion, and allowing the edge of this cloth to project upward above the edge of the part H. Then, after removing the frame C, and before removing the remaining parts, the edges of the upper and lower cloths may be now sewed together, the needle being passed along the beveled edges of the mold and part H. In order to facilitate the operation of upholstering the cushions, and prevent a waste of material, a sample cushion may be first made, and the filling weighed. The same amount of filling, by weight, may thereafter be placed in the mold in making cushions like the sample.

The example of cushion here shown and described is intended for a railway-car seat or chair; but it is evident that substantially the same apparatus may be employed with advantage for the same purpose during the operation of upholstering various articles, the form of the mold and of the parts used in connection with it being correspondingly changed. Where buttons are employed, they may be sewed on by passing the needle through the perforations a a.

Having thus described my invention, what I claim as new, and desire to secure by Letters Patent, is—

The combination of the mold A, the removable frame C, for extending the depth of the mold, and the presser D, having therein the removable part D', to admit of the manipulation of the filling without removing the part D, substantially as and for the purposes specified.

CHARLES F. A. SIERCKS.

Witnesses:
 HENRY SIERCKS,
 F. F. WARNER.